United States Patent

[11] 3,628,268

| [72] | Inventor | Richard N. Johnson<br>Gaithersburg, Md. |
|---|---|---|
| [21] | Appl. No. | 41,340 |
| [22] | Filed | May 28, 1970 |
| [45] | Patented | Dec. 21, 1971 |
| [73] | Assignee | The United States of America as represented by the Secretary of the Army |

[54] PURE FLUID DISPLAY
10 Claims, 2 Drawing Figs.

[52] U.S. Cl. ..................................................... 40/28 R,
350/160
[51] Int. Cl. ........................................................ G09f 11/00
[50] Field of Search............................................. 40/2.2, 28
C, 134; 250/83, 83.3 HP; 350/160 R

[56] References Cited
UNITED STATES PATENTS

| 3,091,876 | 6/1963 | Cole ............................ | 40/28 C |
| 3,323,241 | 6/1967 | Blair et al. .................... | 40/28 C |
| 3,354,565 | 11/1967 | Emmons et al. .............. | 40/28 C |
| 3,413,744 | 12/1968 | Bowles ......................... | 40/28 C |
| 3,415,991 | 12/1968 | Asars............................ | 250/83.3 HP |
| 3,527,945 | 9/1970 | Jankowitz..................... | 250/83.3 HP |

*Primary Examiner*—Robert W. Michell
*Assistant Examiner*—Wenceslao J. Contreras
*Attorneys*—Harry M. Saragovitz, Edward J. Kelly, Herbert Berl and J. D. Edgerton ABSTRACT: A pure fluid display. A thermally sensitive layer whose optical characteristics are a function of temperature is subjected to the impingement of a plurality of fluid sources whose temperature is different from the ambient temperature of the sensitive layer. This produces a temperature pattern on the surface of the sensitive layer which in turn creases a color pattern to correspond to the temperature pattern. The fluid sources, which may comprise the outputs of a plurality of fluid amplifiers, are generally arranged in the form of a two-dimensional array parallel to the surface of the sensitive layer. Coextensive supporting members having low-thermal capacity are provided on both sides of the sensitive layer, the first supporting member being opaque and the second being transparent on the viewing side. A temperature control system is provided to maintain the sensitive layer within a predetermined temperature range.

PATENTED DEC 21 1971

3,628,268

INVENTOR,
RICHARD N. JOHNSON
BY Harry M. Saragovitz
Edward J. Kelly
Herbert Berl
J. D. Edgerton
ATTORNEYS

PURE FLUID DISPLAY

RIGHTS OF GOVERNMENT

The invention described herein may be manufactured, used, and licensed by or for the United States Government for governmental purposes without the payment to me of any royalty thereon.

BACKGROUND OF THE INVENTION

This invention relates to display devices, and more particularly to a device for providing a visual display of an array of fluid sources such as may be derived from the outputs of a plurality of pure fluid amplifiers.

It is often desirable to obtain a visual indication of the output state of one or more pure fluid amplifiers. In the past these indicators have taken the form of commercially available fluid flow indicators or in some cases a plurality of pith cylinders have been provided to move up and down within a piston in response to fluid pressure. All of the previously available display systems have required some mechanical motion or complicated and expensive energy conversion. Such mechanical motion is not only inefficient but often tends to react back on the fluid flow thereby causing inaccuracies in the system. Additionally, mechanically responsive display devices are unreliable in the rugged environments to which such systems are often subjected. One attempt to provide a visual display that does not depend upon mechanical motion has been the use of hot wire anemometers which are responsive to the cooling effect of fluid flowing over them. This latter system is not, however, readily adaptable for providing an area display of an array of fluid sources.

It is, therefore, a primary object of this invention to provide a pure fluid visual display that does not involve mechanical motion or expensive energy conversion.

It is another object of the invention to provide a pure fluid display which is reliable in rugged environments.

Still another object is to provide a visual display of a plurality of fluid sources which are arranged in a two-dimensional array.

SUMMARY OF THE INVENTION

Briefly in accordance with this invention, a thermally sensitive layer whose optical characteristics are a function of temperature is subjected to the impingement of a plurality of fluid sources whose temperature is different from the ambient temperature of the sensitive layer. This produces a temperature pattern on the surface of the sensitive layer which in turn creates a color pattern to correspond to the temperature pattern. The fluid sources, which may comprise the outputs of a plurality of fluid amplifiers, are generally arranged in the form of a two-dimensional array parallel to the surface of the sensitive layer. Coextensive supporting members having low thermal capacity are provided on both sides of the sensitive layer, the first supporting member being opaque and the second being transparent on the viewing side. A temperature control system is provided to maintain the sensitive layer within a predetermined temperature range.

BRIEF DESCRIPTION OF THE DRAWINGS

The specific nature of the invention as well as other objects, aspects, uses and advantages thereof will clearly appear from the following description and from the accompanying drawings, in which.

DESCRIPTION OF THE PREFERRED EMBODIMENT

Figure 1:
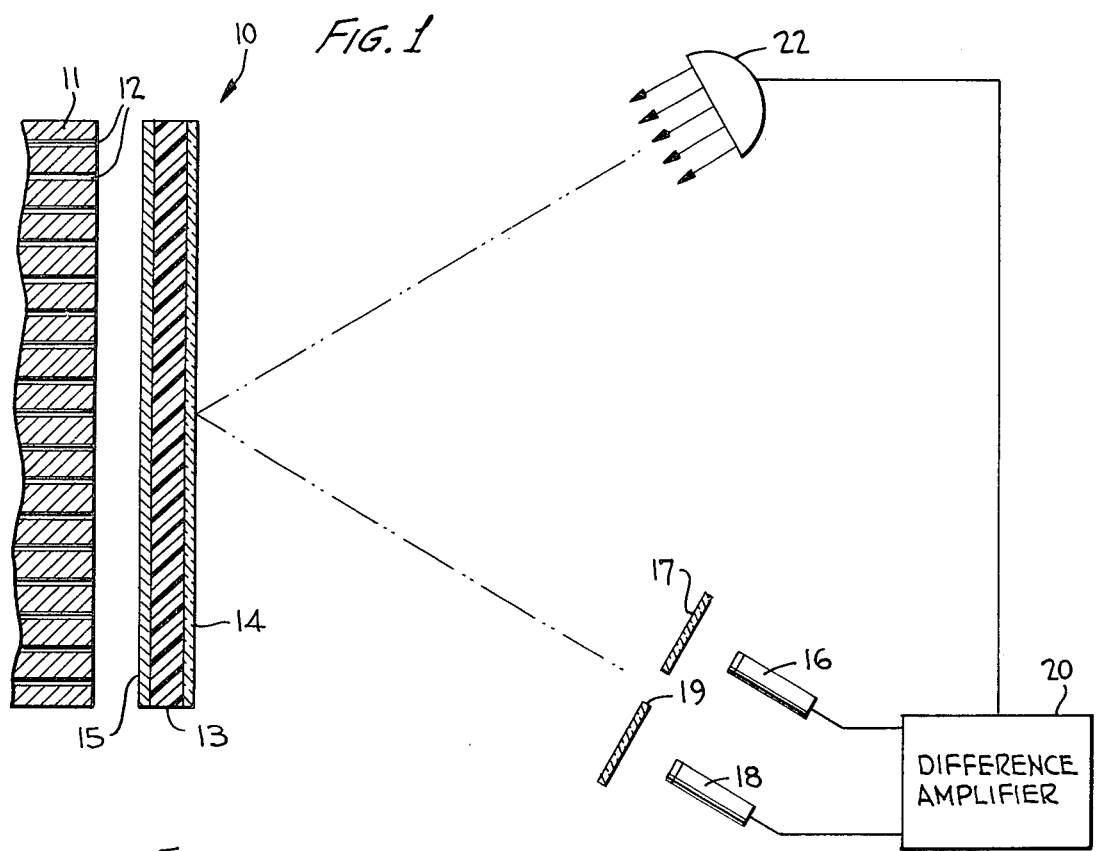
FIG. 1 is a partially sectioned view of one embodiment of the invention.

Referring now to FIG. 1, the visual display is indicated generally at 10. A thermally sensitive layer 13, whose optical characteristics are a function of temperature, is supported by a first coextensive supporting member 15 and a second coextensive supporting member 14. Thermally sensitive layer 13 comprises a liquid crystal layer whose color pattern is a function of the temperature pattern along its surface. Such thermally sensitive layers having an optically active liquid crystal phase are well known to those skilled in the art. For a thorough discussion of liquid crystalline materials, the reader is referred to U.S. Pat. No. 3,114,836 to Fergason, et al., issued Dec. 17, 1963.

Supporting member 15 may comprise a thin support film of material such as aluminum oxide or that known as Mylar, and should be a very thin sheet consistent with providing suitable support for layer 13. In addition, it should have a low thermal capacity and be provided with a thin coating of opaque material. Support member 14 provides support on the viewing side of the display. Generally it should be a transparent protective layer having a low thermal capacity. Thin Mylar, glass or other suitable material may be used for this purpose.

Figure 2:
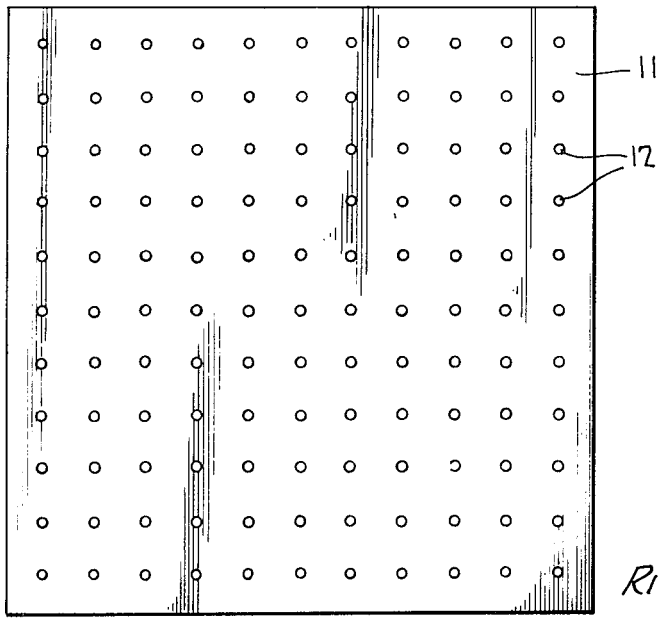
FIG. 2 is a front view of a two-dimensional array of fluid sources in accordance with an embodiment of the invention.

A temperature pattern is applied to thermally sensitive layer 13 by means of a plurality of fluid conduits or channels 12 which are embedded in supporting structure 11. The arrangement may take the form of a two-dimensional array as shown in FIG. 2. Each of channels 12 may conduct fluid flow from each of a plurality of pure fluid amplifiers (not shown).

In operation, one or more of fluid channels 12 direct a flow of cool fluid to impinge upon supporting member 15. This impingement upon surface 15 causes localized cooling which is transferred to thermally sensitive layer 13. Accordingly, a temperature pattern is applied to thermally sensitive layer 13 which responds by changing its color pattern to correspond to the applied temperature pattern. A visual indication of this temperature pattern is produced on the viewing side of display 10.

As is well known, liquid crystal layers only exhibit the unique property of color change in response to temperature while the layer is maintained within a predetermined temperature range. Accordingly, it is necessary to maintain layer 13 within the predetermined ambient temperature range at all times. This can be accomplished in a number of ways depending upon the type of sensitive layer which is employed and the degree of sensitivity desired. Referring again to FIG. 1, a radiant energy heat source 22, which may comprise a suitable heat lamp, is directed at thermally sensitive layer 13 to maintain its desired temperature. A control system is provided to shut off radiant energy source 22 when the predetermined temperature is reached, and to turn on the source when the average temperature falls below the predetermined level. The temperature of layer 13 is sensed by a first photosensitive detector 16 which is provided with a filter 17 and a second photosensitive detector 18 provided with a filter 19. The filters are selected such that each photsensitive detector is responsive only to a given portion of the radiant energy emitted by layer 13, and a difference output is obtained by means of difference amplifier 20 which in turn is applied to radiant energy source 22 to turn it on and off when necessary.

As an example of a suitable filter arrangement, filter 17 may be selected to transmit generally blue light while filter 19 transmits green light. More specifically, the range of the two filters would overlap somewhere in the region between 450 and 500 millimicrons and each filter would transmit a radiant energy range which should be approximately 50 millimicrons wide. Under ideal operating conditions, the average temperature of liquid crystal 13 would be maintained so as to cause only blue light to be reflected from crystal 13 and accordingly only photodetector 16 would be activated. Should the average temperature of crystal layer 13 fall below a predetermined level, crystal layer 13 would reflect light which would be within the transmission range of filter 19. This in turn would activate photodetector 18 thereby causing a difference output to be produced by difference amplifier 20. This differential output would activate radiant energy source 22 to apply heat to layer 13. Once its average temperature was sufficiently raised, its output spectrum would again be limited to transmission only in the range of filter 17 causing radiant energy source 22 to be turned off.

It should be appreciated that the temperature stabilization means shown is merely exemplary and other techniques may be employed. For example, one may employ a temperature stabilization means which would extract heat from layer 13 rather than add heat as heretofore described. In some cases, where the ambient temperature is not expected to vary beyond the range in which layer 13 is sensitive, no stabilization means at all would be required. One fairly simple way of reducing ambient temperature variations would be to place layer 13 within a partially evacuated chamber as suggested in the previously referred to Fergason patent.

It will be appreciated that the visual display herein described may have a wide variety of uses. The possibility exists that a novel radar display could be constructed using only pure fluid signal processing means rather than electronic components. It will thus be appreciated that a novel pure fluid visual display has been disclosed which does not require mechanical motion.

I wish it to be understood that I do not desire to be limited to the exact details of construction shown and described, for obvious modifications will occur to a person skilled in the art.

I claim:
1. A pure fluid visual display comprising:
    a. a thermally sensitive layer whose optical characteristics are a function of temperature;
    b. a plurality of fluid sources directed at said thermally sensitive layer for selectively changing the temperature pattern on said layer; and
    c. means for maintaining the temperature of said thermally sensitive layer within a predetermined range, whereby a visual display of said temperature pattern is provided.

2. The display of claim 1 wherein said fluid sources are arranged in a two-dimensional array.

3. The display of claim 2 wherein said fluid sources comprise the respective outputs of a plurality of fluid amplifiers.

4. The display of claim 1 wherein said thermally sensitive layer comprises a liquid crystal layer whose color pattern is a function of the temperature pattern along its surface.

5. The display of claim 4 further comprising a first supporting member coextensive with said liquid crystal layer and located between said crystal layer and said fluid sources.

6. The display of claim 5 wherein said first supporting member comprises a thin layer of opaque material having low thermal capacity.

7. The display of claim 4 further comprising a transparent protective layer coextensive with said crystal layer and having a low thermal capacity.

8. The display of claim 1 wherein said means for maintaining the temperature comprises means for sensing the temperature of said thermally sensitive layer, means for applying heat whenever the temperature falls below a predetermined level and means for terminating the application of heat whenever the temperature rises above a predetermined level.

9. The display of claim 8 wherein said means for applying heat comprises a source of radiant energy.

10. The display of claim 8 wherein said means for sensing the temperature comprises a first photosensitive device responsive to a portion of the radiant energy emitted by said thermally sensitive layer, a second photosensitive device responsive to a portion of the radiant energy emitted by said thermally sensitive layer, and means for deriving the difference output of said first and second photosensitive devices.

* * * * *